United States Patent [19]

Estrada

[11] Patent Number: 4,916,803
[45] Date of Patent: Apr. 17, 1990

[54] STATOR KEYBAR INSTALLATION USING AUXILIARY PLATES

[75] Inventor: Luis A. Estrada, Clifton Park; Alexander J. Smolenski, Scotia, both of N.Y.

[73] Assignee: General Electric Company, Schenectady, N.Y.

[21] Appl. No.: 361,811

[22] Filed: May 30, 1989

Related U.S. Application Data

[63] Continuation of Ser. No. 258,401, Oct. 17, 1988, abandoned.

[51] Int. Cl.⁴ ............................................. H02K 15/14
[52] U.S. Cl. ...................................... 29/596; 310/42; 310/217; 310/259
[58] Field of Search ................... 29/596, 598; 310/42, 310/91, 217, 254, 258, 259

[56] References Cited

U.S. PATENT DOCUMENTS

| | | | |
|---|---|---|---|
| 3,708,707 | 1/1973 | Kranz | 310/358 |
| 4,485,320 | 11/1984 | Kawada et al. | 310/217 |
| 4,564,779 | 1/1986 | Terry, Jr. | 310/42 |
| 4,634,909 | 1/1987 | Brem | 310/217 |

FOREIGN PATENT DOCUMENTS

| | | | |
|---|---|---|---|
| 928533 | 5/1982 | U.S.S.R. | 310/259 |
| 1600239 | 10/1981 | United Kingdom | 310/259 |

*Primary Examiner*—Carl E. Hall
*Attorney, Agent, or Firm*—Jerome C. Squillaro

[57] ABSTRACT

Keybar slots in support plates of a large generator stator are made substantially oversize to accommodate the full probable distortion of the support plates occurring during fabrication of the stator frame. Keybars are affixed to pairs of auxiliary plates. The keybars are aligned within the oversize keybar slots, and then the auxiliary plates are affixed or welded to the stator support plates.

3 Claims, 5 Drawing Sheets

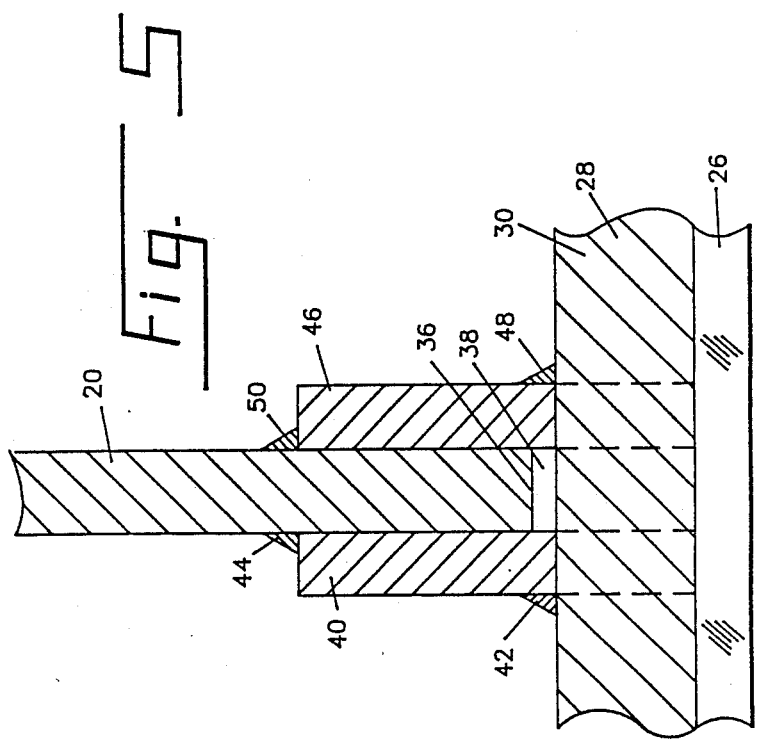

STATOR KEYBAR INSTALLATION USING AUXILIARY PLATES

This is a continuation of application Ser. No. 258,401, filed 10/17/88, now abandoned.

BACKGROUND OF THE INVENTION

The present invention relates to dynamoelectric machines and, more particularly, to large AC generators.

A large AC generator employs a rotor that rotates within a stator to generate electricity. The rotor is magnetized by DC power in field windings to form one or more pairs of magnetic poles. The stator includes a large mass of magnetic material within which a plurality of stator windings are embedded. As the rotor rotates, the resulting rotation of the magnetic field induces AC electricity in the stator windings.

A large stator is built up within a stator frame by laying up individual arcuate laminae. Each lamina has two or more dovetail slots in its outer edge for engagement with a keybar. The keybars are affixed within the stator frame for this purpose.

For some smaller conventional generator stators, the keybars are extruded or pre-machined members having the required cross section. These are affixed in precision slots in the stator frame by welding or bolting. As the size of the generator stator increases, the cross section of the keybars also increases. With the largest generator stators, it is not practical or economical to install preformed keybars in precision slots. The stator frame becomes so distorted during fabrication that the locations of the precision slots may be displaced as much as, for example, one-half inch. This far exceeds the tolerances for positioning keybars which require accurate location within less than one-sixteenth inch.

One conventional solution includes deferring the forming of the slots in the stator frame until after fabrication. While this overcomes the problems of displacement due to distortion, techniques available for doing machining on the scale required for large generators requires precise layouts and special tools. Following machining of the slots, the keybars are attached by welding or bolting. When bolts are used, the additional complication of accurate bolthole placement must be overcome.

Another conventional solution provides for installing bars of stock in the stator frame with enough material to permit machining of the keybar shape in place after fabrication and attachment of the bars. This solution can exceed the capability of a manufacturing facility to perform the required accurate machining operations over such long distances and in materials of such large cross section.

OBJECTS AND SUMMARY OF THE INVENTION

It is an object of the invention to provide a technique for installing keybars which overcomes the drawbacks of the prior art.

It is a further object of the invention to provide a keybar system in which oversize slots are provided in support plates in a stator frame. Keybars are affixed in auxiliary plates having skirts that overlap the support plates about a substantial portion of the oversize slots. The auxiliary plates are affixed, thereby affixing the key bars.

Briefly stated, the present invention provides a generator stator having keybar slots in support plates that are made substantially oversize to accommodate the full probable distortion of the support plates occurring during fabrication of the stator frame. Keybars are affixed to pairs of auxiliary plates. The keybars are aligned within the oversize keybar slots, and then the auxiliary plates are affixed or welded to the stator support plates.

According to an embodiment of the invention, there is provided a stator comprising: a stator frame, a plurality of support plates extending radially inward from the stator frame, a plurality of laminae forming an armature, each of the laminae including at least one dovetail slot in an outer edge thereof, at least one keybar, at least one enlarged slot in an inner edge of the plurality of support plates, the at least one enlarged slot being large enough to provide a substantial clearance between itself and the at least one keybar at all possible conditions of the stator frame, at least one auxiliary plate affixed to the at least one keybar, the at least one auxiliary plate overlapping the at least one support plate, and extending substantially beyond the at least one enlarged slot, and means for affixing the at least one auxiliary plate to one of the plurality of support plates.

According to a feature of the invention, there is provided a stator comprising: a stator frame, a plurality of parallel support plates extending radially inward from the stator frame, a plurality of laminae forming an armature, each of the laminae including at least one dovetail slot in an outer edge thereof, a plurality of keybars disposed parallel to a longitudinal axis of the stator frame, a plurality enlarged slots in an inner edge of the plurality of support plates, each of the plurality of support plates including corresponding enlarged slots for receiving the plurality of keybars, each of the plurality of enlarged slots being large enough to provide a substantial clearance between itself and its respective keybar at all possible conditions of the stator frame, a plurality of auxiliary plates, each of the plurality of auxiliary plates being affixed to one of the plurality of keybars at a position placing the a facing surface of the auxiliary plate immediately adjacent a surface of one of the plurality of support plates, each of the plurality of auxiliary plates overlapping its respective adjacent surface, and extending substantially beyond its respective enlarged slot, means for affixing each of the auxiliary plates to its respective support plate, and the substantial clearances permitting alignment of all of the plurality of keybars, regardless of distortion in the stator frame and the plurality of support plates.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5 is a cross section taken along V—V in FIG. 4.

DETAILED DESCRIPTION OF THE PREFERRED EMBODIMENT

Figure 1:
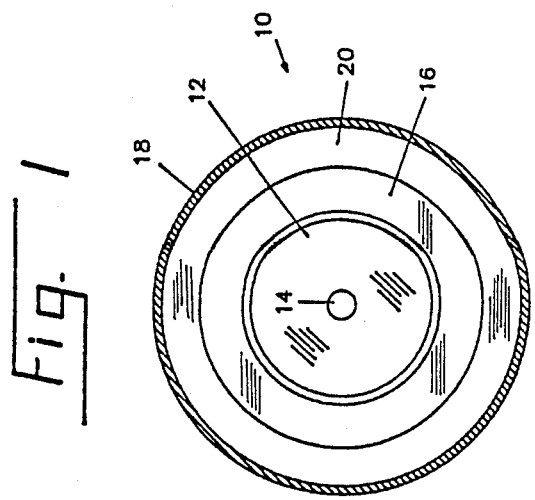
FIG. 1 is an end view, partially in cross section, or a schematic view of a large AC generator to illustrate general positional relationships of elements used,, in the description of the prior art and of the present invention.

Referring now to FIG. 1, there is shown, generally at 10, a highly schematic end view, in partial cross section, of a generator. A rotor 12 is supported for rotation upon a shaft 14 within an armature 16. A stator frame 18 includes a plurality of annular support plates 20 (only one of which is shown) spaced apart along a longitudinal axis thereof.

Conventional elements such as field windings in rotor 12, bearings for supporting shaft 14, and armature windings in armature 16 are all omitted from FIG. 1 and the present description. It is believed that such conventional elements, being well known by all those skilled in the art, do not require description herein.

Figure 2:
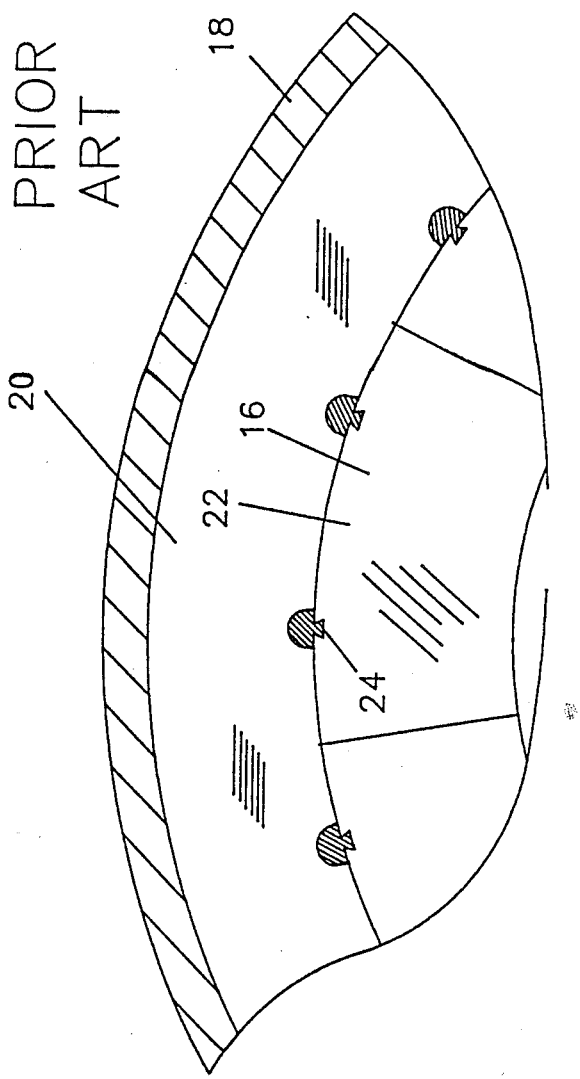
FIG. 2 is an enlarged view of a portion of the large AC generator of FIG. 1, illustrating one technique used in the prior art for affixing keybars to support plates.
Figure 3:
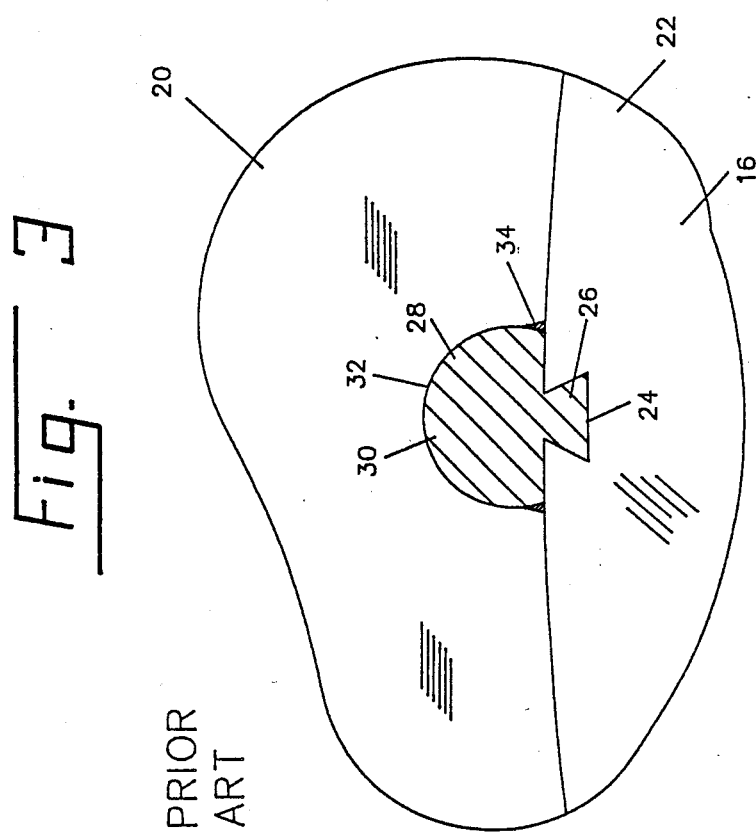
FIG. 3 is a further enlarged view of the vicinity of one of the prior-art keybars of FIG. 2.

Referring now to FIGS. 2 and 3, armature 16 is formed by stacking a plurality of thin, mutually insulated arcuate laminae 22 to form an annulus. Each lamina 22 includes two or more dovetail slots 24 fitting onto respective dovetails 26 of keybars 28. Keybar 28 includes a semi-cylindrical portion 30 fitting into a precision keybar slot 32. The junctions of keybar 28 with support plate 20 include welds 34.

As noted in the background of the invention, distortion in stator frame 18 and support plates 20, produced during fabrication of a large AC generator, causes unacceptable misalignment of corresponding keybar slots 32 on the plurality of support plates 20. Thus, it is not practical to form keybar slots 32 in support plates 20 before fabrication, as would be desired from a manufacturability standpoint.

A further possibility in the prior art, but not illustrated, includes bolting keybars 28 to their support plates 20. This possibility suffers a similar drawback in that the required bolt holes cannot be drilled before fabrication of stator frame 18, with support plates 20 installed therein.

Figure 4:
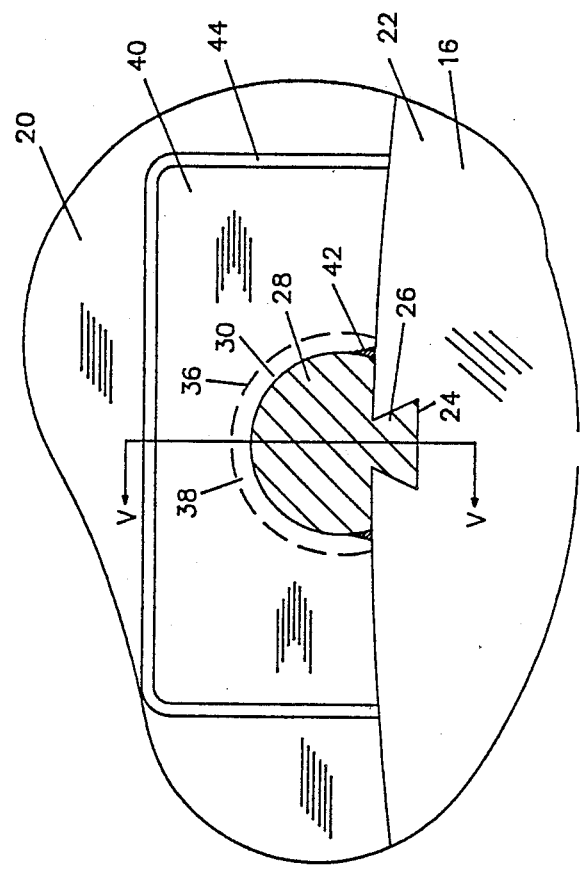
FIG. 4 is a view, corresponding to FIG. 3, but of a technique for mounting keybars according to the present invention.

Referring now to FIG. 4, an embodiment of the invention is shown in which an enlarged slot 36 (shown in dashed line) is formed in support plate 20 thus leaving a substantial clearance 38 between itself and semi-cylindrical portion 30 of keybar 28. An auxiliary plate 40 is affixed to keybar 28 by a weld 42. Auxiliary plate 40 is, in turn, affixed to support plate 20 by a further weld 44.

Referring now also to FIG. 5, a further auxiliary plate 46, on the opposite side of support plate 20, is affixed to keybar 28 by a weld 48 and to support plate 20 by a further weld 50.

Enlarged slots 36 are sized to produce clearances 38 that exceeds the maximum transverse distortion of support plate 20. Thus, auxiliary plates 40 and 46 can be installed in accurate positions, using simple jigs, prior to being welded in place. Accordingly, enlarged slots 36 can be formed in support plates 20 prior to fabrication, as is desired.

One skilled in the art will recognize that the technique for affixing auxiliary plates 40 and 46 to support plate 20 is not necessarily limited to welding. It is within the contemplation of the inventor that auxiliary plates could be affixed to support plates by other means such as, for example, by bolting or riveting, and such other means for affixing should be considered to fall within the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of manufacturing a dynamoelectric machine, the dynamoelectric machine including a stator having a plurality of outer circumferentially spaced dovetail slots, a stator frame having a plurality of spaced support plates, and a plurality of auxiliary plates, the method comprising the steps of:

forming a plurality of keybars each having a substantially semi-circular portion with an extending dovetail shaped portion;

machining a plurality of circumferentially spaced enlarged slots into each support plate for receiving the semi-circular portions of the keybars, each enlarged slot being large enough to provide a clearance between itself and a respective one of the keybars at each of the support plates and each of the slots being axially aligned with other corresponding slots in others of the support plates for establishing a substantially straight array of axially aligned slots for receiving a keybar;

forming a semi-circular slot in each of the auxiliary plates having a dimension to provide a close interface with the semi-circular portion of the respective one of the keybars;

welding each of the auxiliary plates to the respective one of the keybars with a continuous weld extending along the interface therebetween;

welding each of the auxiliary plates to a respective one of the support plates for positioning each of the keybars at a preselected position with respect to a centerline of the stator frame; and assembling the stator into the stator frame with each dovetail portion of the keybars extending into a respective one of the dovetail slots in the stator for supporting the stator in the stator frame.

2. The method of claim 1 wherein the step of welding the auxiliary plates to the support plates includes the step of welding an auxiliary plate to each side of a corresponding support plate.

3. A method of fabricating a stationary assembly for a dynamoelectric machine, the stationary assembly including a housing having a centerline axis, a pair of generally opposite ends on the housing, an interior surface in the housing between the opposite ends and extending generally coaxially about the generally annular frames having generally radially spaced apart inner and outer circumferential surfaces, a plurality of grooves in the inner circumferential surface of each annular frame and predeterminately spaced apart generally arcuately about the annular frame, a plurality of bars each having a non-rectangular portion with a key portion extending therefrom, a plurality of plates each having an opening intersecting a side edge of the plate with the opening having a configuration conforming to that of the non-rectangular portion of the bars, and a plurality of laminations having opposite faces, and formed of a ferromagnetic material with each lamination having a plurality of keyways therein, the method comprising the steps of:

disposing the frames in generally axially spaced apart relation within the interior surface of the housing between the opposite ends thereof;

receiving the outer aforementioned surface of the frames at least adjacent the interior surface of the housing during the disposing step;

aligning the grooves in the frames at least generally axially during the disposing step;

welding respective ones of the frames at least adjacent the outer circumferential surface thereof to the interior surface of the housing when the respective ones of the frames are disposed within the interior surface;

positioning the bars in axially aligned relation within the housing between the opposite ends thereof;

locating the non-rectangular portion of the bars at least in part within the axially aligned grooves in the frames during the positioning step;

arranging the non-rectangular portion of the bars in spaced apart relation with the grooves in the frame during the locating step;

extending the keys on the bars generally radially inwardly toward the centerline axis of the housing during the locating step;

overlaying the plates with the respective ones of the frames;

placing the opening in each plate at least adjacent the non-rectangular portion of a respective one of the bars;

welding each plate at least adjacent its opening to the non-rectangular portion of the respective ones of the bars and also to the frame thereby to retain the bars in the axially aligned relation thereof within the housing;

mounting the laminations in assembly relation generally in face-to-face engagement with each other on the bars within the housing;

passing the laminations into the housing from at least one of the opposite ends thereof during the mounting step;

sliding the keyways on the laminations onto the key portions of the bars during the passing step; and retaining the laminations against displacement from the assembly relation thereof.

* * * * *